(12) United States Patent
Rapaport et al.

(10) Patent No.: US 7,662,495 B2
(45) Date of Patent: Feb. 16, 2010

(54) PASSIVE RESTRICTION PATHWAYS IN FUEL CELL WATER DRAINAGE

(75) Inventors: Pinkhas A Rapaport, Fairport, NY (US); Eric L Thompson, Honeoye Falls, NY (US)

(73) Assignee: GM Global Technologies Operations, Inc.

( * ) Notice: Subject to any disclaimer, the term of this patent is extended or adjusted under 35 U.S.C. 154(b) by 887 days.

(21) Appl. No.: 10/981,848

(22) Filed: Nov. 5, 2004

(65) Prior Publication Data
US 2006/0099470 A1 May 11, 2006

(51) Int. Cl.
H01M 8/04 (2006.01)
H01M 8/02 (2006.01)

(52) U.S. Cl. ............... 429/25; 429/38; 429/13; 429/34

(58) Field of Classification Search .......... 429/34–39, 429/13
See application file for complete search history.

(56) References Cited

U.S. PATENT DOCUMENTS

| | | | |
|---|---|---|---|
| 3,554,809 A | 1/1971 | Craft | |
| 4,988,583 A | 1/1991 | Watkins et al. | |
| 5,108,849 A | 4/1992 | Watkins et al. | |
| 5,300,370 A | 4/1994 | Washington et al. | |
| 5,686,199 A | 11/1997 | Cavalca et al. | |
| 5,776,625 A | 7/1998 | Kaufman et al. | |
| 5,981,098 A | 11/1999 | Vitale | |
| 6,099,984 A | 8/2000 | Rock | |
| 6,387,558 B1 | 5/2002 | Mizuno et al. | |
| 6,893,708 B2 | 5/2005 | Shen et al. | |
| 7,223,489 B2* | 5/2007 | Ueda et al. | 429/22 |
| 2002/0182467 A1* | 12/2002 | Ballantine et al. | 429/26 |
| 2004/0028959 A1* | 2/2004 | Horiuchi et al. | 429/12 |
| 2004/0112740 A1* | 6/2004 | Shen et al. | 204/263 |
| 2005/0100777 A1* | 5/2005 | Gurin et al. | 429/38 |
| 2005/0142400 A1* | 6/2005 | Turco et al. | 429/13 |

FOREIGN PATENT DOCUMENTS

| | | |
|---|---|---|
| DE | 10055253 A1 | 5/2002 |
| DE | 10234821 A1 | 2/2004 |
| EP | 1496558 A1 | 11/2003 |
| WO | 03/015202 A1 | 2/2003 |

* cited by examiner

Primary Examiner—Patrick Ryan
Assistant Examiner—Stephen Yanchuk
(74) Attorney, Agent, or Firm—Harness, Dickey & Pierce, P.L.C.

(57) ABSTRACT

A passive restriction passageway (for example, a passive capillary valve or a restricting orifice) positioned to drain accumulated liquid from a fuel cell reactant flow channel is used in conjunction with a control element for periodically adjusting the pressure across the passageway. The control element intermittently adjusts pressure across the passageway to enable liquid flow through the passageway. The restriction passageways and the adjustment of pressure periodically move liquid water through the passageways to drain liquid buildup from the reactant supply channels. Together, these features enable sustained performance from the fuel cell during operation and also prevent damage to the fuel cell when the fuel cell is exposed to freezing temperatures (especially after shutdown of the fuel cell).

23 Claims, 7 Drawing Sheets

PASSIVE RESTRICTION PATHWAYS IN FUEL CELL WATER DRAINAGE

FIELD OF THE INVENTION

The present invention relates to fuel cell power systems and methods for consistent provision of gaseous reactant feeds to the power system; in this regard, the invention controls liquid water blockage of gaseous flow in channels supplying reactant to the fuel cell stack.

BACKGROUND OF THE INVENTION

Fuel cell power systems convert a fuel and an oxidant to electricity. One fuel cell power system type of keen interest employs use of a proton exchange membrane (hereinafter "PEM") to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system.

In a typical fuel cell assembly (stack) within a fuel cell power system, individual fuel cells have flow fields with inlets to fluid manifolds; these collectively provide channels for the various reactant and cooling fluids reacted in the stack to flow into each cell. Gas diffusion assemblies then provide a final fluid conduit to further disperse reactant fluids from the flow field space to the reactive anode and cathode; these diffusion sections are frequently advantageously embedded as a part of the design of collector electrodes pressing against the reactive anode and cathode.

PEM fuel cell stacks are typically designed with serpentine flow fields. Serpentine flow fields are desirable as they effectively distribute reactants over the active area of an operating fuel cell, thereby improving performance and stability. On the other hand, effective operation of a PEM requires operation of the flow field channels and gas diffusion assemblies in non-flooded states. However, in this regard, an operational problem arises as certain portions of serpentine flow fields accumulate liquid water during fuel cell operation. This liquid water is undesirable, as it alters flow distribution of the reactant gases, and it can also remain in the stack even after a considerable purge. In freezing conditions, water plugs remaining in a channel after stack shutdown are a basis for severe mechanical damage to the fuel cell as the remaining liquid water is transformed into ice. U-bend (180-degree turn) portions of the serpentine flow channels are particularly prone to such water build up.

What is needed, is a way of preventing significant water build up during operation of a fuel cell power system along with a way of removing any water build up when it does occur. The present invention is directed to fulfilling this and other related needs in a fuel cell.

SUMMARY OF THE INVENTION

The present invention is for a fuel cell and/or method of operating a fuel cell (where the fuel cell has at least one membrane electrode assembly in reactive interface to at least one oxidant reactant flow channel carrying an oxidant reactant and to at least one fuel reactant flow channel carrying a fuel reactant) where the fuel cell has a passive restriction passageway in fluid connection between a liquid accumulation portion of one reactant flow channel and a liquid reception portion of one reactant flow channel and a control element intermittently adjusting the pressures between the accumulation and reception portions so that liquid flows from the liquid accumulation portion to the liquid reception portion as a result of the pressure adjustment. The liquid accumulation portion contains fluid at a first pressure, and the liquid reception portion contains fluid at a second pressure. The first pressure is operationally maintained to be greater than the second pressure; but the control element intermittently adjusts the first pressure in relation to the second pressure to provide a low pressure difference between the first pressure and the second pressure at a first setting of the control element, and a high pressure difference between the first pressure and the second pressure at a second setting of the control element. The passive restriction passageway provides a fluid passageway having a length and a cross sectional area sufficient to preclude flow of the liquid between the liquid accumulation portion and the liquid reception portion at the lower pressure difference, but sufficient to enable flow at the higher of the pressure differences.

In one aspect of the invention, the passive restriction passageway is a capillary passive restriction passageway. In another aspect of the invention, the passive restriction passageway is a restriction orifice.

In further aspects of the invention, the liquid accumulation portion and the liquid reception portion are both within the same channel; one of the channels is a serpentine channel; and/or one of the channels has a channel curvature subtended by angularity of at least 90 degrees.

In still further aspects of the invention, the control element is a control module controlling any of a variable speed compressor, a valve controlling pressure in the liquid accumulation portion, and/or a valve for controlling pressure in the liquid reception portion. The control module may also measure inputs from sensor(s) measuring either of the pressures and/or the speed of the compressor.

In yet further aspects of the invention, the channels and restriction passageway have surfaces of differing wetting (hydrophilic or hydrophobic) character.

In considering benefits from the invention, the restriction passageways and the adjustment of pressure periodically move liquid water through the passageways to drain liquid buildup from the reactant supply channels. Together, these features enable sustained performance from the fuel cell during operation and also prevent damage to the fuel cell when the fuel cell is exposed to freezing temperatures (especially after shutdown of the fuel cell).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention is further understood with reference to a generic fuel cell power system. Therefore, before further describing the invention, a general overview of the power system within which the improved fuel cells of the invention operate is provided.

Figure 1:
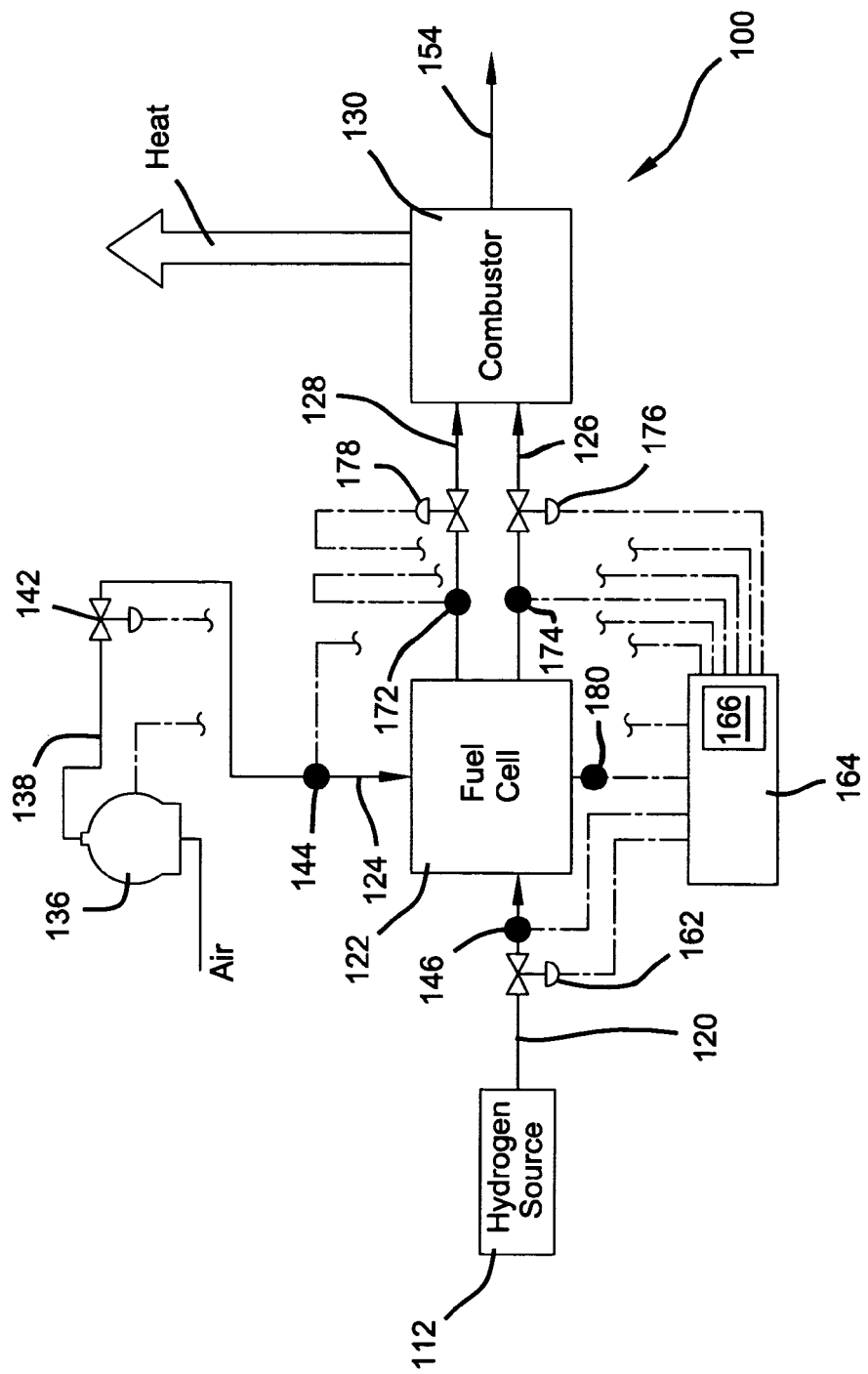
FIG. 1 shows a fuel cell power system overview.

As shown in FIG. 1, fuel cell power system 100 includes a hydrogen source 112 in the form of stored hydrogen or a fuel processor for providing a hydrogen stream 120.

Concurrent with the feeding of hydrogen stream 120 through control valve 162 into the anode chamber of fuel cell stack 122, oxygen in the form of air in stream 124 is fed into the cathode chamber of fuel cell stack 122. Stream 124 is first compressed in (variable speed) compressor 136 and fed through pipe 138 to control valve 142. Pressure sensor 144 measures the condition of pressure in stream 124 as applied to cathode sides of the PEM in fuel cell stack 122. A pressure sensor 146 measures the condition of pressure in stream 120 as applied to anode sides of the PEM in fuel cell stack 122.

The hydrogen stream 120 and the oxygen from oxidant stream 124 react in fuel cell stack 122 to produce electricity. Electrical power sensor 180 measures the condition of electrical power generated by fuel cell stack 122 through a measure of voltage, amperage, or wattage, or a combination of these.

Anode exhaust (or effluent) 126 from the anode side of fuel cell stack 122 flows through backpressure control valve 176 to combustor 130. Cathode exhaust (or effluent) 128 from the cathode side of fuel cell stack 122 flows through backpressure control valve 178 to combustor 130. Pressure sensor 172 measures the condition of pressure in stream 128. Pressure sensor 174 measures the condition of pressure in stream 126.

Control valve 162, compressor 136, control valve 142, pressure sensor 146, electrical power sensor 180, backpressure control valve 178, backpressure control valve 176, pressure sensor 172, pressure sensor 174, and pressure sensor 144 are in signal connection to control module 164. Control module 164 regulates conditions in streams 124, stream 128, stream 126, and/or stream 120 by operating control valve 162, compressor 136, backpressure control valve 178, backpressure control valve 176, and control valve 142 in response to signals from any of pressure sensor 146, electrical power sensor 180, pressure sensor 172, pressure sensor 174, and pressure sensor 144. In one embodiment, compressor 136 is a variable speed compressor operating essentially as a control valve regulating oxidant feed stream 124 to fuel cell stack 122. Controller program 166 (also denoted as "software" and/or "executable logic" and/or an "executable program" as a data scheme holding data and/or formulae information and/or program execution instructions) is provided in control module 164 for controlling operation of power system 100. In one embodiment, computer 164 and controller program 166 are provided as an ASIC (application-specific integrated circuit).

Fuel cell power system 100 may be stationary or may be an auxiliary power system in a vehicle. In a preferred embodiment, however, fuel cell power system 100 powers a vehicle such as a passenger car, truck, or van.

Figure 2:
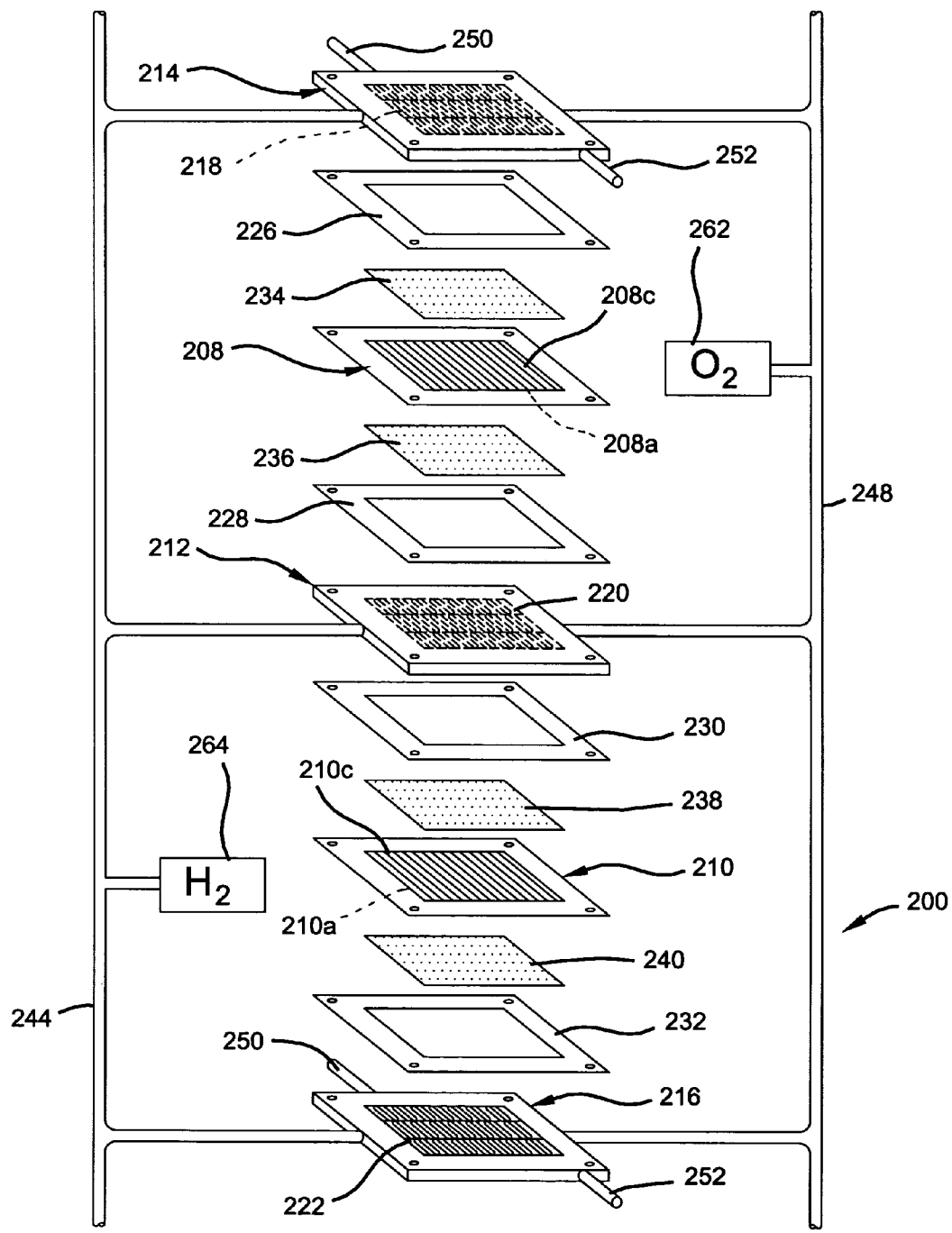
FIG. 2 shows detail in a portion of a PEM fuel cell stack within the fuel cell stack assembly of the fuel cell power system of FIG. 1.

Turning now to FIG. 2, a partial PEM fuel cell stack 200 of fuel cell stack 122 is schematically depicted as having a pair of membrane electrode assemblies (MEAs) 208 and 210 separated from each other by a non-porous, electrically-conductive bipolar plate 212. Each of MEAs 208, 210 have a cathode face 208c, 210c and an anode face 208a, 210a. MEAs 208, 210 and bipolar plate 212 are stacked together between non-porous, electrically-conductive, liquid-cooled end plates 214 and 216 (the bipolar plate 212 may be liquid cooled as well). Plates 212, 214, 216 each include respective flow fields 218, 220, 222 established from a plurality of flow channels formed in the faces of the plates for distributing fuel and oxidant gases (i.e., $H_2$ & $O_2$) to the reactive faces of MEAs 208, 210. Nonconductive gaskets or seals 226, 228, 230, 232 provide sealing and electrical insulation between the several plates of fuel cell stack 200.

Porous, gas permeable, electrically conductive sheets 234, 236, 238, 240 press up against the electrode faces of MEAs 208, 210 and serve as primary current collectors for the respective electrodes. Primary current collectors 234, 236, 238, 240 also provide mechanical supports for MEAs 208, 210, especially at locations where the MEAs are otherwise unsupported in the flow field. Suitable primary current collectors include carbon/graphite paper/cloth, fine mesh noble metal screens, open cell noble metal foams, and the like which conduct current from the electrodes while the mesh and/or open cell portions function as gas diffusers in allowing reactant gases to pass therethrough.

Bipolar plate 214 presses up against primary current collector 234 on cathode face 208c of MEA 208, bipolar plate 216 presses up against primary current collector 240 on anode face 210a of MEA 210, and bipolar plate 212 presses up against primary current collector 236 on anode face 208a of MEA 208 and against primary current collector 238 on cathode face 210c of MEA 210.

An oxidant gas 262 such as air/oxygen is supplied to the cathode side of the partial fuel cell stack 200 from air compressor 136 and line 124 via appropriate supply plumbing 248. In a preferred embodiment, oxygen 262 is in air supplied to the cathode side from the ambient. A fuel such as hydrogen, or hydrogen containing reformate, 264 is supplied to the anode side of fuel cell 200 from stream 120 via appropriate supply plumbing 244.

Exhaust plumbing (not shown) for both the $H_2$ and $O_2$/air sides of MEAs 208, 210 is also provided for removing anode effluent from the anode flow field and the cathode effluent from the cathode flow field. Coolant plumbing 250, 252 is provided for supplying and exhausting liquid coolant to bipolar plates 212, 214, 216, as needed.

It is to be noted that fuel cell stack 200 shows two fuel cells with plate 212 shared between the two fuel cells and plates 214 and 216 shared between one of the shown fuel cells and, in each case, another fuel cell not depicted in FIG. 2. In this regard, a "fuel cell" within a fuel cell stack is not physically fully separable insofar as any particular fuel cell in the stack shares at least one side of a bipolar plate with another cell.

Figure 3:
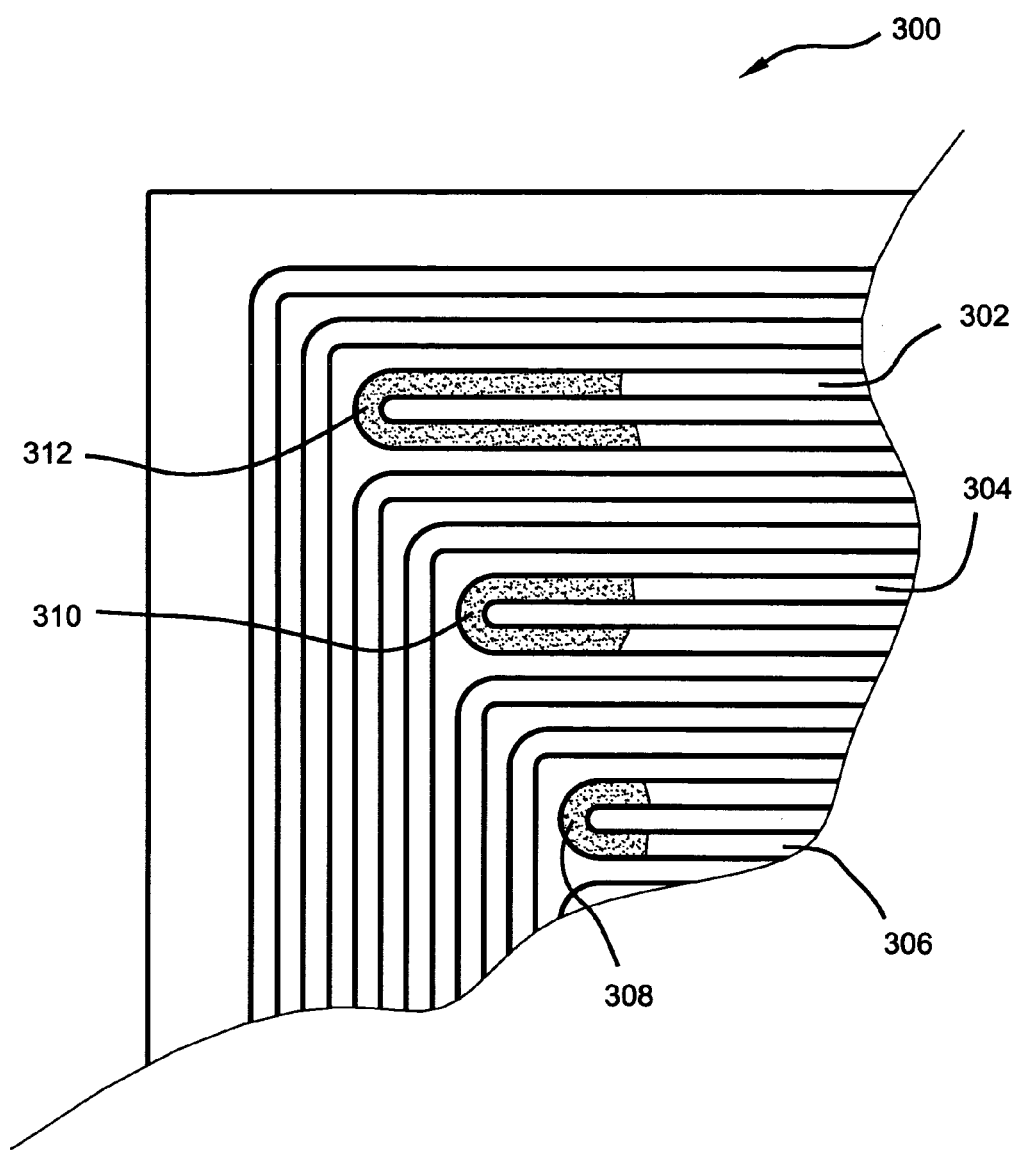
FIG. 3 shows blocked reactant flow channels as determined from a fuel cell stack test.

FIG. 3 shows blocked reactant flow channels 300 as determined from a fuel cell stack test after operation of a fuel cell and subsequent freezing of the fuel cell before disassembly. In this regard, FIG. 3 is derived from a photo-image of a flow channel field plate used in the test. In this regard, blocked reactant flow channels 300 are an example of the plurality of flow channels formed in the faces of any of plates 212, 214, 216 for distributing fuel and oxidant gases (i.e., $H_2$ & $O_2$) to the reactive faces of MEAs 208, 210. Channels 302, 304, and 308 each have a bend, for example a U-bend (180-degree turn) portion. Although a 180 degree U-bend is shown, it should be understood that other bend angles or shapes that accumulate water may also benefit from the present invention. More specifically, each of channels 302, 304, and 306 have a portion with a channel curvature subtended by angularity of at least 90 degrees or with other shapes that accumulate water. An ice plug 312 defines a liquid accumulation portion of channel 302. An ice plug 310 defines a liquid accumulation portion of channel 304. An ice plug 308 defines a liquid accumulation portion of channel 306. In this regard, each of ice plugs 312, 310, and 308 derive from accumulations of liquid water in the respective liquid accumulation portions of channels 302, 304, and 306 during operation of the fuel cell stack.

Figure 4A:
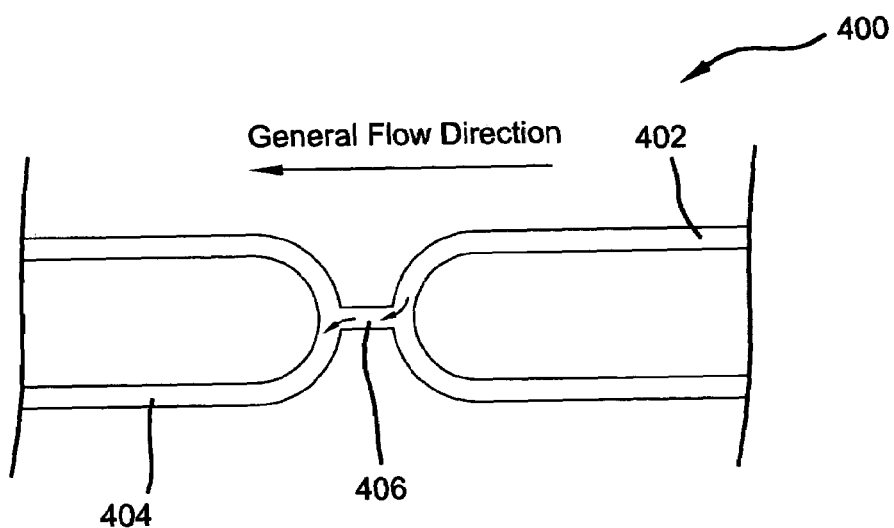
FIG. 4A and FIG. 4B present two types of passive restriction passageways.
Figure 4B:
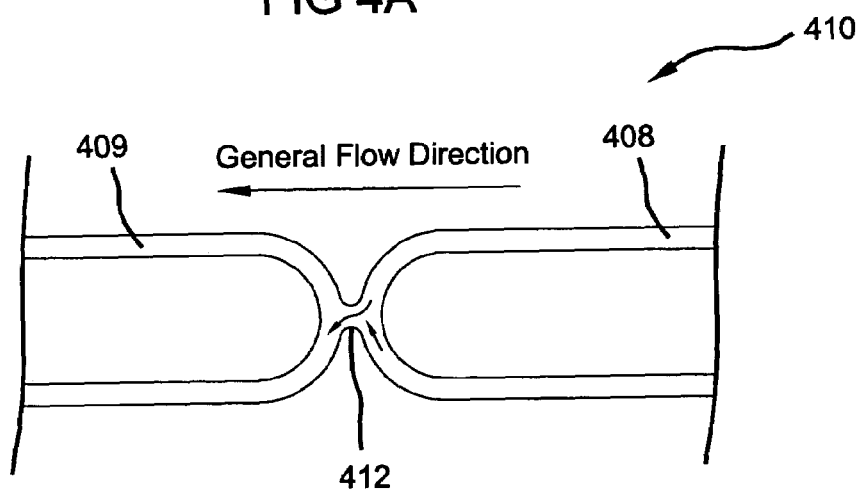

FIG. 4A presents a capillary passive restriction passageway design 400, and FIG. 4B presents a restriction orifice passive restriction passageway design 410. Capillary passive restriction passageway design 400 provides a capillary passive restriction passageway 406 having a length L in fluid connection between a liquid accumulation portion in the U-bend of channel 402 and a liquid reception portion of an adjacent channel or a different portion of the same channel 404 (illustrated in a U-bend configuration, but which can have any shape including a straight or curved configuration). See FIG. 4C. The liquid accumulation portion of channel 402 contains fluid at a pressure greater than the pressure of the liquid reception portion of channel 404. Similarly, restriction orifice passive restriction passageway design 410 provides a restriction orifice passive restriction passageway 412 in fluid connection between a liquid accumulation portion in the U-bend of channel 408 and a liquid reception portion of channel 409 (also in a U-bend or other configuration). The liquid accumulation portion of channel 408 contains fluid at a pressure greater than the pressure of the liquid reception portion of channel 409.

As passive restriction valves, capillary passive restriction passageway 406 and restriction orifice passive restriction passageway 412 each have a respective length L and a cross sectional area designed to preclude flow of liquid water between the respective liquid accumulation portions of channels 402 and 408 and the respective liquid reception portions of channels 404 and 409 when the pressure across the respective passageways is below a low pressure threshold. But the respective length and a cross sectional area of either of capillary passive restriction passageway 406 and restriction orifice passive restriction passageway 412 is also designed to enable flow of liquid water between the respective liquid accumulation portions of channels 402 and 408 and the respective liquid reception portions of channels 404 and 409 when the pressure across the respective passageways is above a high pressure threshold.

Figure 4C:
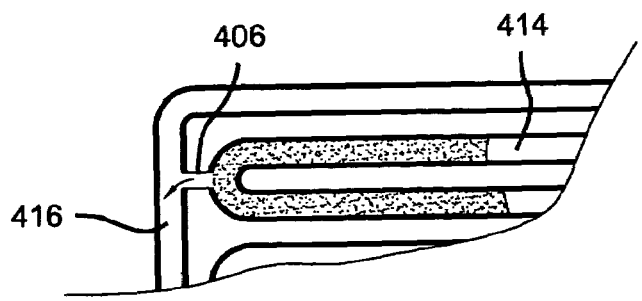
FIG. 4C presents a passive restriction passageway connecting a U-bend portion and a straight portion of the same channel or of two different channels.

Capillary passive restriction passageway 406 and restriction orifice passive restriction passageway 412 therefore enable flow fields such as flow fields 218, 220, 222 to have a small drainage feature either in the U-bends of plate channels or in other areas in the stack flow field where water is known to accumulate. The small drainage feature is, in other words, a by-pass channel cutting across the land to a companion flow channel. In one embodiment, the companion flow channel is a subsequent portion of the channel having the liquid accumulation portion. In an alternative embodiment, the companion flow channel is an independent channel from the channel having the liquid accumulation portion. FIG. 4C illustrates a detail view of a capillary passive restriction passageway 406 disposed between a channel 414 and a straight section 416 with arrows illustrating the water drainage direction.

As previously noted, when the pressure across the restrictive passageway is below a low pressure threshold, the by-pass "valve" is "shut" to liquid passage so that the portion of the channel in fluid connection to the by-pass fills with water as reactant flow proceeds through the main reactant channel (402 or 408). Then, as water accumulates in the channel (in the U-bend), the pressure drop across capillary passive restriction passageway 406 (or restriction orifice passive restriction passageway 412) is increased (through use of control module 164) to cause flow of the liquid through the passageway. In the cathode case, the shift in pressure is enabled by, without limitation, increasing the speed of variable compressor 136 (as shown on the cathode of FIG. 1), lowering the back pressure of line 128 by use of valve 178, and/or increasing pressure of line 124 by use of valve 142. In the anode case, the shift in pressure is enabled by, without limitation (as shown on the anode of FIG. 1), lowering the pressure of line 126 by use of valve 176, and/or increasing pressure of line 120 by use of valve 162. As should be appreciated, control module 164 effects the pressure shift, in one embodiment, in conjunction with measurements from sensors 180, 144, 146, 172, and 174 as appropriate.

This pressure differential shift across the by-pass restriction passageway pushes the water out of the U-bend where it is accumulating and into a liquid receiving portion of a channel, so that the liquid water is more advantageously positioned for subsequent removal from the fuel cell stack. The magnitude of the pressure shift (extended pulse) need only be several kPa, (for example, without limitation, less than 10 kPa), which is a function of geometry, surface properties of the capillary valve surface, viscosity and surface tension of the liquid.

In one embodiment, control module 164 executes the pressure adjustment at some pre-determined timed interval. In this regard, for example and without limitation in one embodiment, a pressure adjustment (pressure shift) to the higher level of pressure difference (enabling liquid flow) occurs every 90 seconds for a high pressure difference duration of about 15 seconds. In an alternative embodiment, control module 164 executes the pressure adjustment when power output sensed via power measurement 180 drops below a threshold value. In yet other embodiments, control module 164 executes the pressure adjustment when the pressure or a pressure difference as sensed by any of or a combination of pressure sensors 146, 174, 172, and 144 shifts beyond a threshold value.

In one embodiment, capillary passive restriction passageway 406 (or restriction orifice passive restriction passageway 412) have fluid contact surfaces of a hydrophilicity different from the hydrophilicity of the fluid contact surface of the liquid accumulation portion of the channel (402 or 408, respectively) to which they are in fluid connection. In one embodiment, for example and without limitation, a polymeric fluorocarbon provides the surface of the capillary passive restriction passageway. This consideration provides a further degree of freedom in by-pass drain design for the flow fields so that a certain pressure difference threshold is effective in enabling liquid passage from accumulation sections of the flow channels. In general the requirement for capillary passive restriction passageway 406 or restriction orifice passive restriction passageway 412 dimensioning and/or surfacing is that: (a) under normal, static operating pressure, the size and shape of the orifice must be small enough that the surface tension of the water present is too great to allow drainage of the water through the orifice; and that (b) an acceptable pressure rise is defined and programmed (in program 166 of control module 164) to periodically (and/or upon water buildup) create a pressure gradient which will overcome this surface tension and "push" the water through capillary passive restriction passageway 406 or restriction orifice passive restriction passageway 412 to drain the channel.

Efficient operation of a fuel cell is best enabled when the pressure drop across the MEA (208, 210) is maintained to a close tolerance. Accordingly, in one embodiment, control module 164 executes the pressure adjustment to, for example, the anode side of fuel cell 122 when the pressure is adjusted for purge on the cathode of fuel cell 122 so that the pressure difference across the MEA remains optimally balanced (for example, without limitation, to a difference of less than 3 kPa) during the purging of liquid. In this regard, control module 164 uses measurements as sensed by pressure sensors 146, 174, 172, and/or 144, or a combination thereof, to control pressures through use of valves 142, 162, 176, and/or 178, or a combination thereof.

Figure 5:
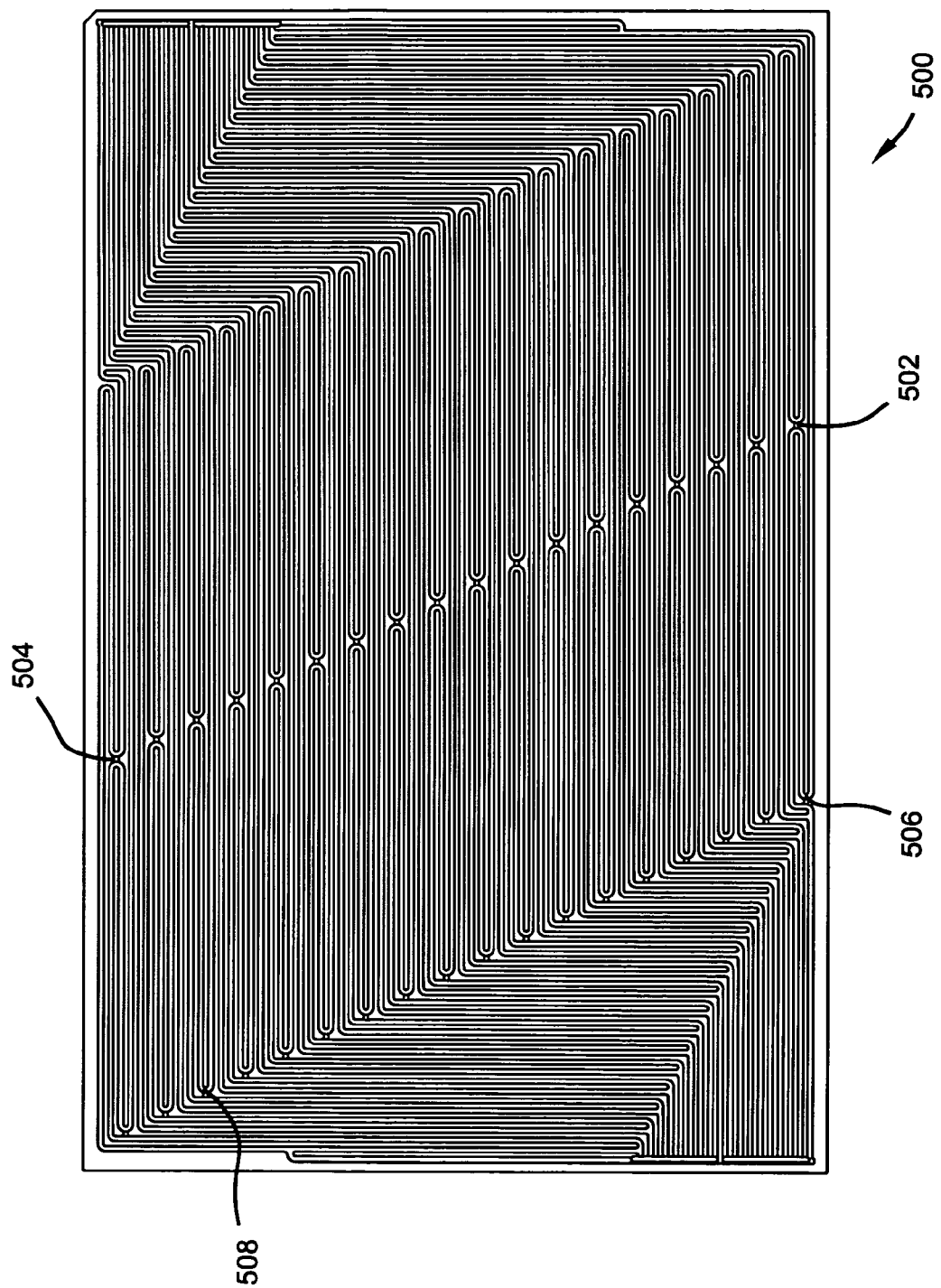
FIG. 5 shows a first flow channel plate design with incorporated passive restriction passageways.

FIG. 5 shows one embodiment of a flow channel plate design 500 with incorporated passive restriction passageways. Capillary passive restriction passageway 406 instances are shown at capillary passive restriction passageway instances 502, 504, 506, and 508 with further capillary passive restriction passageway instances disposed diagonally in FIG. 5 between instances 502 and 504 and also between 506 and 508. In FIG. 5, instances 502-504 connects U-bends of adjacent channels and instances 506-508 connect U-bends and L-bends of the same channel.

Figure 6:
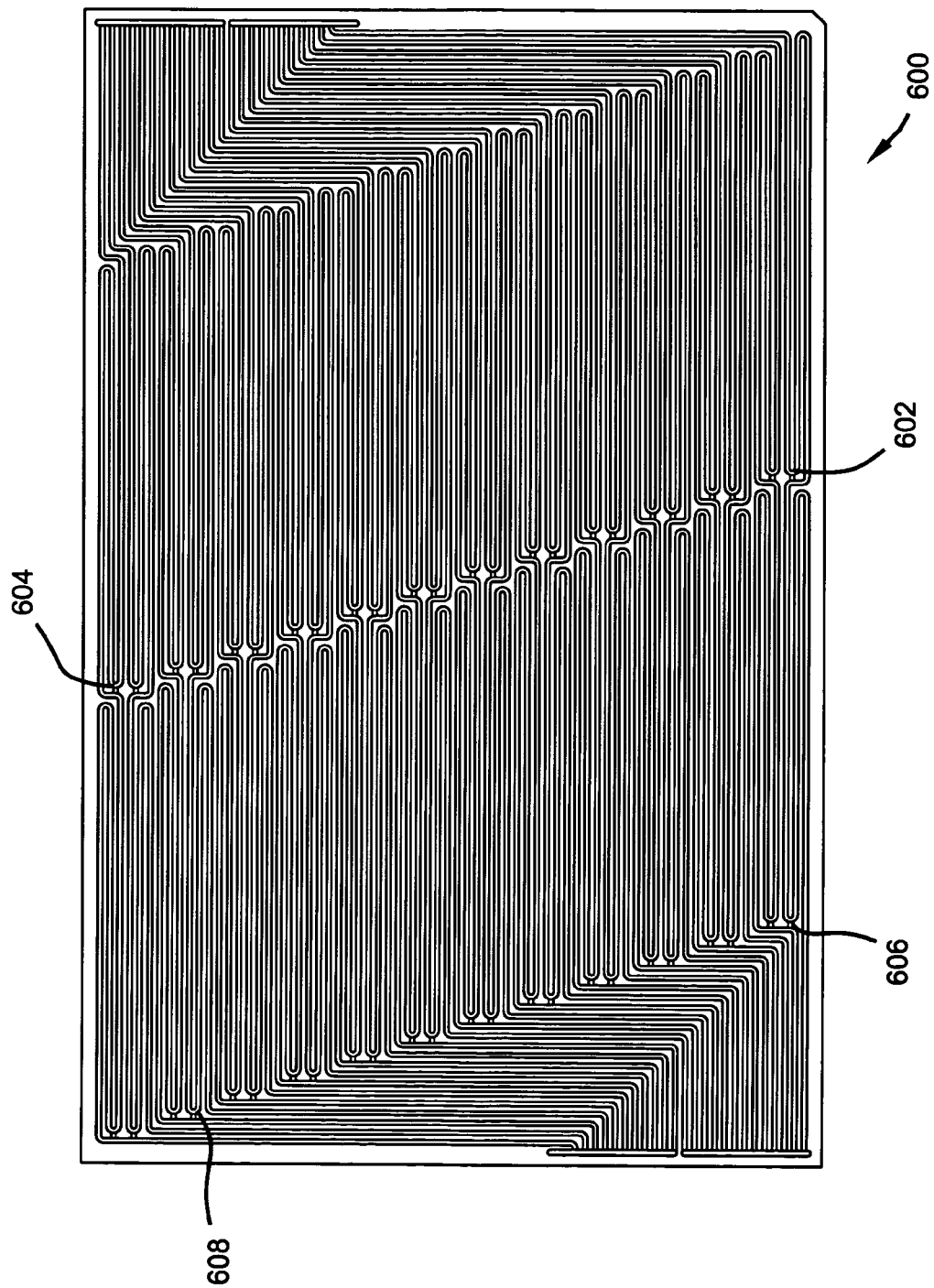
FIG. 6 shows a second flow channel plate design with incorporated passive restriction passageways.

FIG. 6 shows an alternative embodiment of a flow channel plate design 600 with incorporated passive restriction passageways. Capillary passive restriction passageway 406 instances are shown at capillary passive restriction passageway instances 602, 604, 606, and 608 with further capillary passive restriction passageway instances disposed diagonally in FIG. 6 between instances 602 and 604 and also between 606 and 608. In flow channel plate design 600, as differentiated from flow channel plate design 500, the passive restriction passageways are disposed between U-bends in one flow channel and a straight portion of a second channel where the straight portion is proximate to two channel curvatures subtended by fluid flow arc angles of 90 degrees in a non-reversing serpentine curvature segment of a channel.

Either of designs 500 or 600 are preferably manifested a bi-polar plate in rounded, square, rectangular, or triangular channels. Plates derived from designs 500 and/or 600 are preferably manufactured by either stamping, etching, or molding procedures.

Figure 7A:
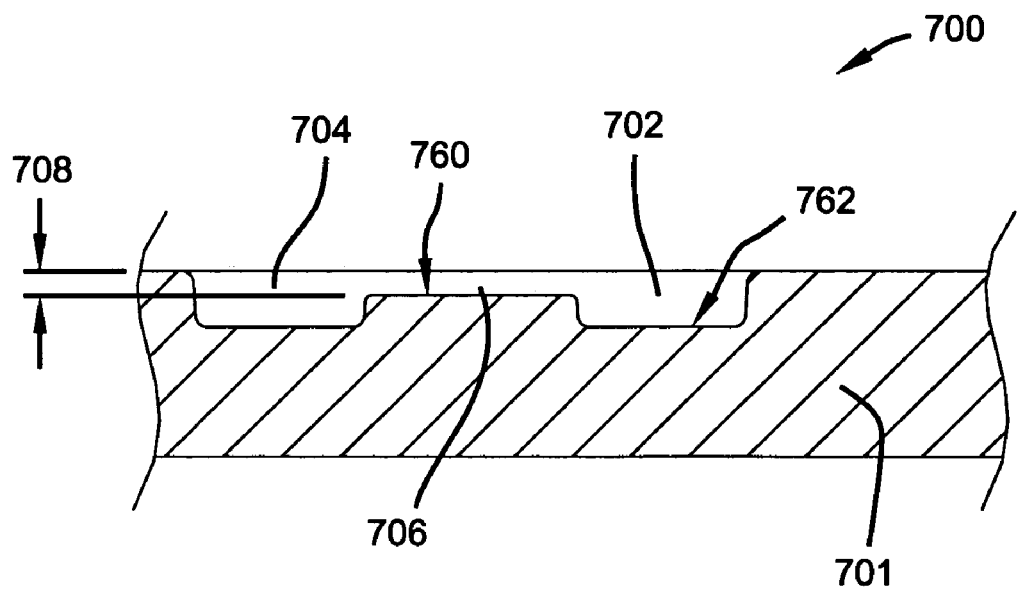
FIG. 7A and FIG. 7B show cross-sectional detail in the passive restriction passageways of the channel plate designs of FIG. 5 and FIG. 6.
Figure 7B:
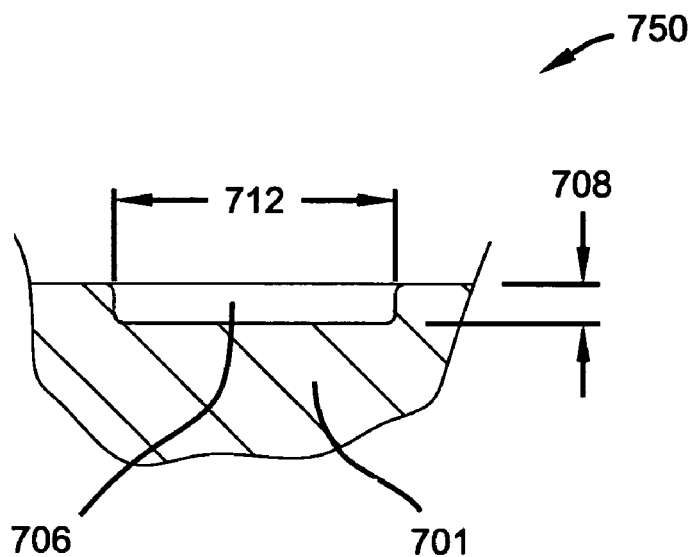

FIG. 7A and FIG. 7B show cross-sectional detail in one embodiment of the passive restriction passageways of the channel plate designs of either FIG. 5 and/or FIG. 6. FIG. 7A shows cross-sectional detail along the elongation axis of capillary passive restriction passageway 706 between liquid accumulation portion 702 of one channel and liquid reception portion 704 of a second channel. FIG. 7B shows cross-sectional detail across the elongation axis of capillary passive restriction passageway 706.

In one embodiment, fluid contact surface 760 of capillary passive restriction passageway 706 has a surface property different from the surface property of fluid contact surface 762 of liquid accumulation portion 702. This can be enabled by any of different polishing approaches, different applied coatings and/or alloy finishing, and/or different material portions within plate 701. In one embodiment, capillary passive restriction passageway 706 has a depth 708 of 0.20 mm, width 712 of 1.4 mm, and elongation of about 1.7 mm.

The passive restriction passageway further enables efficient water removal at shutdown of the fuel cell stack. This has value in avoiding corrosion within the fuel cell and has value in preparation of the fuel cell for storage at freezing temperatures. In this regard, control module 164 effects a series of pressure pulsations at shutdown along with purges of substantial duration to insure that all liquid water has been thoroughly removed from the fuel cell stack.

The described preferred embodiments provide efficient water removal at shutdown to prepare the fuel cell stack for freezing conditions. In this regard, a relatively non-disruptive periodic pressure shift is periodically used to implement a "clearing" effect to sustain fuel cell performance in normal operation. However, a long duration purge and/or a series of pressure shifts and pulses are used when the fuel cell is operationally shut down to insure that liquid water has been thoroughly removed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system including a fuel cell having at least one membrane electrode assembly in reactive interface to at least one reactant flow channel carrying a reactant comprising:

said fuel cell comprising a passive restriction passageway in fluid connection between a liquid accumulation portion of one said channel and a liquid reception portion of one said channel, said liquid accumulation portion containing fluid at a first pressure, said liquid reception portion containing fluid at a second pressure lower than said first pressure; and a control means for intermittently adjusting said first pressure in relation to said second pressure, said adjusting providing a first pressure difference between said first pressure and said second pressure at a first setting of said control means, said adjusting providing a second pressure difference between said first pressure and said second pressure at a second setting of said control means, said second pressure difference being greater than said first pressure difference;

wherein said passive restriction passageway provides a fluid passageway having a length and a cross sectional area sufficient to preclude flow of said liquid between said liquid accumulation portion and said liquid reception portion at said low pressure difference, and sufficient to enable flow of said liquid in said passageway between said liquid accumulation portion and said liquid reception portion at said second pressure difference.

2. The system of claim 1, wherein said passive restriction passageway has a passageway fluid contact surface that has a hydrophilicity that differs from the hydrophilicity of said liquid accumulation portion channel fluid contact surface.

3. The system of claim 1, wherein said passive restriction passageway is a passive capillary valve.

4. The system of claim 1, wherein said passive restriction passageway is a restricting orifice.

5. The system of claim 1, wherein said liquid accumulation portion and said liquid reception portion are both within the same channel.

6. The system of claim 5, wherein said channel is a serpentine channel.

7. The system of claim 1, wherein said liquid accumulation portion of said channel has a curved channel portion having a curvature subtended by angularity of at least 90 degrees and said passive restriction passageway is connected to said curved channel portion.

8. The system of claim 1, wherein said control means comprises a variable speed compressor and a control module, said control module adjusting said variable speed compressor.

9. The system of claim 8, further comprising a sensor for measuring the speed of said variable speed compressor, said sensor in signal connection to said control module.

10. The system of claim 1, wherein said control means comprises a valve for controlling pressure in said liquid accumulation portion and a control module, said control module adjusting said valve.

11. The system of claim 10, comprising a sensor for measuring said first pressure, said sensor in signal connection to said control module.

12. The system of claim 1, wherein said control means further comprises a valve for controlling pressure in said liquid reception portion and a control module, said control module adjusting said valve.

13. The system of claim 12, comprising a sensor for measuring said second pressure, said sensor in signal connection to said control module.

14. A method for operating a system including a fuel cell having at least one membrane electrode in reactive interface to at least one reactant flow channel carrying a reactant comprising:
  connecting a passive restriction fluid passageway between a liquid accumulation portion of one said channel and a liquid reception portion of one said channel, said liquid accumulation portion containing fluid at a first pressure, said liquid reception portion containing fluid at a second pressure lower than said first pressure; and
  adjusting said first pressure in relation to said second pressure, said adjusting providing a first pressure difference between said first pressure and said second pressure at a first setting of a control system, said adjusting providing a second pressure difference between said first pressure and said second pressure at a second setting of said control system, said second pressure difference being greater than said first pressure difference;
  wherein said connecting provides a fluid passageway having a length and a cross sectional area sufficient to preclude flow of said liquid between said liquid accumulation portion and said liquid reception portion at said first pressure difference and sufficient to enable flow of said liquid in said passageway between said liquid accumulation portion and said liquid reception portion at said second pressure difference.

15. The method of claim 14, wherein said first pressure is maintained greater than said second pressure.

16. The method of claim 14, wherein said liquid accumulation portion of said channel has a curved channel portion having a curvature subtended by angularity of at least 90 degrees and said passive restriction fluid passageway is connected to said curved channel portion.

17. The method of claim 14, wherein said adjusting adjusts a variable speed compressor.

18. The method of claim 17, wherein said adjusting further comprises measuring the speed of said variable speed compressor.

19. The method of claim 14, wherein said adjusting controls a pressure in said liquid accumulation portion.

20. The method of claim 14, wherein said adjusting further comprises measuring said first pressure.

21. The method of claim 14, wherein said adjusting controls pressure in said liquid reception portion.

22. The method of claim 14, wherein said adjusting further comprises measuring said second pressure.

23. The method of claim 14, wherein said first pressure is greater than said second pressure when said control system is adjusted to either of said first setting or said second setting.

* * * * *